United States Patent
Ejiri (10) Patent No.: US 8,301,814 B2
(45) Date of Patent: Oct. 30, 2012

(54) MANAGEMENT OF STORAGE MEDIA DEVICE CONNECTED TO A ROOT HUB

(75) Inventor: Taichi Ejiri, Nagoya (JP)

(73) Assignee: Buffalo Inc., Nagoya (JP)

( * ) Notice: Subject to any disclaimer, the term of this patent is extended or adjusted under 35 U.S.C. 154(b) by 257 days.

(21) Appl. No.: 12/822,909

(22) Filed: Jun. 24, 2010

(65) Prior Publication Data

US 2010/0332703 A1    Dec. 30, 2010

(30) Foreign Application Priority Data

Jun. 26, 2009    (JP) ................... 2009-152322

(51) Int. Cl.
*G06F 13/00* (2006.01)

(52) U.S. Cl. ................ 710/104; 710/9; 711/115

(58) Field of Classification Search .......... 711/115; 710/104, 313, 8–10, 15, 16
See application file for complete search history.

(56) References Cited

U.S. PATENT DOCUMENTS

| | | | |
|---|---|---|---|
| 6,075,858 A * | 6/2000 | Schwartzman | 705/52 |
| 6,496,839 B2 * | 12/2002 | Cabrera et al. | 707/999.203 |
| 7,543,287 B2 * | 6/2009 | Zimmer et al. | 717/168 |
| 7,784,032 B2 * | 8/2010 | Yamazaki et al. | 717/121 |
| 2008/0239378 A1 * | 10/2008 | Uno | 358/1.15 |

FOREIGN PATENT DOCUMENTS

JP    4-255018    9/1992

* cited by examiner

*Primary Examiner* — Glenn A Auve
(74) *Attorney, Agent, or Firm* — Beyer Law Group LLP (57) ABSTRACT

Improves ease of operation by making it easier for the operator to view and select storage media devices connected to a computer unit. Provides a computer unit with a USB root hub and running an operating system that has the function of managing a storage media device connected to the root hub directly or indirectly via a hub. The unit includes a topology configuration portion that, when the hub is connected to a port of the root hub and the storage media device is connected to the hub, configures the hub as a virtual drive and sets up a connection whereby a folder corresponding to the storage media device is placed in the virtual drive; and a display controller that displays on a display device a directory list DP of the connections that were configured by the topology configuration portion.

13 Claims, 10 Drawing Sheets

MANAGEMENT OF STORAGE MEDIA DEVICE CONNECTED TO A ROOT HUB

CROSS REFERENCE TO RELATED APPLICATIONS

The present application claims the priority based on Japanese Patent Application No. 2009-152322 filed on Jun. 26, 2009, the disclosure of which is hereby incorporated by reference in its entirety.

BACKGROUND

1. Technical Field

The present invention relates to a technique for managing a storage media device (or storage media) connected to a root hub of a prescribed interface.

2. Description of the Related Art

Conventionally, operating systems such as Windows™ or MS-DOS™ have the function of managing storage areas (storage media devices) that are connected to a computer unit. With this function, storage areas connected to the computer unit are managed by being assigned alphabetical drive letters in order starting from "C:".

However, according to the conventional technique, individual drives corresponding to storage areas are simply arranged in logically parallel manner. A resultant problem was poor ease of operation due to the fact that it was difficult for the operator to view and select drives.

SUMMARY

An advantage of some aspects of the invention is to improve ease of operation by making it easier for the operator to view and select storage media devices connected to a computer unit.

The present invention is addressed to attaining the above objects at least in part according to the following aspects of the invention.

A first aspect of the present invention provides a computer unit furnished with a root hub of a prescribed interface, and running an operating system that has the function of managing a storage media device connected to the root hub directly or indirectly via a hub. The computer unit includes a topology configuration portion that, when a hub is connected to a port of the root hub and the storage media device is connected to the hub, configures the hub as a virtual drive and sets up a connection whereby a folder corresponding to the storage media device is placed in the virtual drive; and a display controller that displays on a display device a directory list of connections that were configured by the topology configuration portion.

According to the computer unit of the first aspect, a hub connected to the root hub is displayed as a single class, and one or a plurality of storage media devices connected to the hub are shown as being included in that class. Specifically, the storage media device is shown categorized under Hub class reflecting the hub to which it is connected. It is therefore easier for the operator to view and select storage media devices that are connected to the computer unit. The computer unit according to the first aspect thus affords improved ease of operation.

As another possible feature of the computer unit according the first aspect, the display controller includes a folder display controller that through operation of the operating system brings up a directory display of drive letters and of folders contained in drives to which the drive letters correspond, and the topology configuration portion includes a first command module that, when connection of the hub is detected, prompts the operating system to assign a drive letter to the hub; and a second command module that, when connection of the storage media device is detected, prompts the operating system to mount the storage media device into the drive having the assigned drive letter.

According to this feature of the computer unit, the display controller may be constituted by the simple feature of having the first command module and the second command module issue commands to the operating system, thereby affording a simpler arrangement.

A second aspect of the present invention provides a computer unit furnished with a root hub of a prescribed interface, and running an operating system that has the function of managing storage media that are connected to the root hub. The computer unit includes a topology configuration portion that, when a reader device adapted to read a plurality of storage media is connected to a port of the root hub and additionally the storage media are loaded into the reader device, configures the reader device as a virtual drive and sets up a connection whereby a folder corresponding to the storage media is placed in the virtual drive; and a display controller that displays on a display device a directory list of connections that were configured by the topology configuration portion.

According to the computer unit of the second aspect, a reader device connected to the root hub is displayed as a single class, and one or a plurality of storage media loaded into the reader device are shown as being included in that class. Specifically, storage media are shown categorized under Reader class reflecting the reader device in which they are loaded. It is therefore easier for the operator to view and select storage media connected to the computer unit. The computer unit according to the second aspect thus affords improved ease of operation.

As another possible feature of the computer unit according the second aspect, the display controller includes: a folder display controller that through operation of the operating system brings up a directory display of drive letters and of folders contained in drives to which the drive letters correspond, and the topology configuration portion includes: a first command module that, when connection of the reader device is detected, prompts the operating system to assign a drive letter to the reader device, and a second command module that, when loading of the storage media is detected, prompts the operating system to mount the storage media into the drive having the assigned drive letter.

According to this feature of the computer unit, the display controller may be constituted by the simple feature of having the first command module and the second command module issue commands to the operating system, thereby affording a simpler arrangement.

A third aspect of the present invention provides a computer unit furnished with a root hub of a prescribed interface, and running an operating system that has the function of managing a storage media device connected to the root hub. The computer unit includes a topology configuration portion that, when the storage media device is connected directly or indirectly to the root hub, configures the root hub as a virtual drive and sets up a connection whereby a folder corresponding to the storage media device is placed in the virtual drive; and a display controller that displays on a display device a directory list of connections that were configured by the topology configuration portion.

According to the computer unit of the third aspect, the root hub is displayed as a single class, and one or a plurality of storage media devices connected directly or indirectly to the root hub are shown as being included in that class. Specifically, the storage media device is shown categorized under a prescribed interface connection class corresponding to that of the root hub to which it is connected. It is therefore easier for the operator to view and select storage media devices that are connected to the computer unit. The computer unit according to the third aspect thus affords improved ease of operation.

As another possible feature of the computer unit according the third aspect, the display controller includes: a folder display controller that through operation of the operating system brings up a directory display of drive letters and of folders contained in drives to which the drive letters correspond, and the topology configuration portion includes: a first command module that prompts the operating system to assign a drive letter to the root hub; and a second command module that, when connection of the storage media device to the root hub is detected, prompts the operating system to mount the storage media device into the drive having the assigned drive letter.

According to this feature of the computer unit, the display controller may be constituted by the simple feature of having the first command module and the second command module issue commands to the operating system, thereby affording a simpler arrangement.

As yet another possible feature of the computer unit according to any one of the first to third aspects, the prescribed interface is an interface compliant with USB standards. This feature affords compatibility with USB storage media devices and storage media. For the computer unit according to the third aspect in particular, where the prescribed interface is configured as a USB compliant interface, the storage media devices can be categorized under the USB connection class.

A fourth aspect of the present invention provides a computer processing method for managing a storage media device connected to a root hub of a prescribed interface directly or indirectly via a hub. This computer processing method includes the steps of: when the hub connected to a port of the root hub and the storage media device is connected to the hub, configuring the hub as a virtual drive and setting up a connection whereby a folder corresponding to the storage media device is placed in the virtual drive; and displaying on a display device a directory of the configured connections.

A fifth aspect of the present invention provides a computer processing method for managing storage media that are connected to a root hub of a prescribed interface. This computer processing method includes the steps of: when a reader device adapted to read a plurality of storage media connected to a port of the root hub and additionally the storage media are loaded into the reader device, configuring the reader device as a virtual drive and setting up a connection whereby a folder corresponding to the storage media is placed in the virtual drive; and displaying on a display device a directory of the configured connections.

A sixth aspect of the present invention provides a computer processing method for managing a storage media device connected to a root hub of a prescribed interface. This computer processing method includes the steps of: when the storage media device is connected directly or indirectly to the root hub, configuring the root hub as a virtual drive and setting up a connection whereby a folder corresponding to the storage media device is placed in the virtual drive; and displaying on a display device a directory of the configured connections.

A seventh aspect of the present invention provides a computer program product for a computer unit furnished with a root hub of a prescribed interface, and running an operating system that has the function of managing a storage media device connected to the root hub directly or indirectly via a hub. This computer program product includes a computer readable medium and a computer program stored on the computer readable medium. The computer program includes a portion for prompting the operating system to assign a drive letter to the hub when connection of the hub to a port of the root hub is detected; a portion for prompting the operating system to mount the storage media device into the drive having the assigned drive letter when connection of the storage media device to the hub is detected.

An eighth aspect of the present invention provides a computer program product for a computer unit furnished with a root hub of a prescribed interface, and running an operating system that has the function of managing storage media connected to the root hub. This computer program product includes a computer readable medium and a computer program stored on the computer readable medium. The computer program includes a portion for prompting the operating system to assign a drive letter to the reader device when connection of a reader device adapted to read a plurality of storage media to a port of the root hub is detected; a portion for prompting the operating system to mount the storage media into the drive having the assigned drive letter when loading of the storage media into the storage media device is detected.

A ninth aspect of the present invention provides a computer program product for a computer unit furnished with a root hub of a prescribed interface, and running an operating system that has the function of managing a storage media device connected to the root hub. This computer program product includes a computer readable medium and a computer program stored on the computer readable medium. The computer program includes a portion for prompting the operating system to assign a drive letter to the root hub; a portion for prompting the operating system to mount the storage media device into the drive having the assigned drive letter when connection of the storage media device directly or indirectly to the root hub is detected.

The computer processing method according to the fourth aspect of the invention and the computer program product according to the seventh aspect of the invention respectively afford working effects comparable to the computer unit according to the first aspect of the invention. The computer processing method according to the fifth aspect of the invention and the computer program product according to the eighth aspect of the invention respectively afford working effects comparable to the computer unit according to the second aspect of the invention. The computer processing method according to the sixth aspect of the invention and the computer program product according to the ninth aspect of the invention respectively afford working effects comparable to the computer unit according to the third aspect of the invention.

The present invention can be realized in various additional modes such as a recording medium having recorded thereon the computer program in accordance with the preceding seventh aspect or eighth aspect or ninth aspect; or a data signal containing the computer program and carried on a carrier wave.

DESCRIPTION OF THE PREFERRED EMBODIMENTS

The embodiments of the present invention are described below, with reference to the accompanying drawings.

A. Embodiment 1

1. Hardware Configuration

Figure 1:
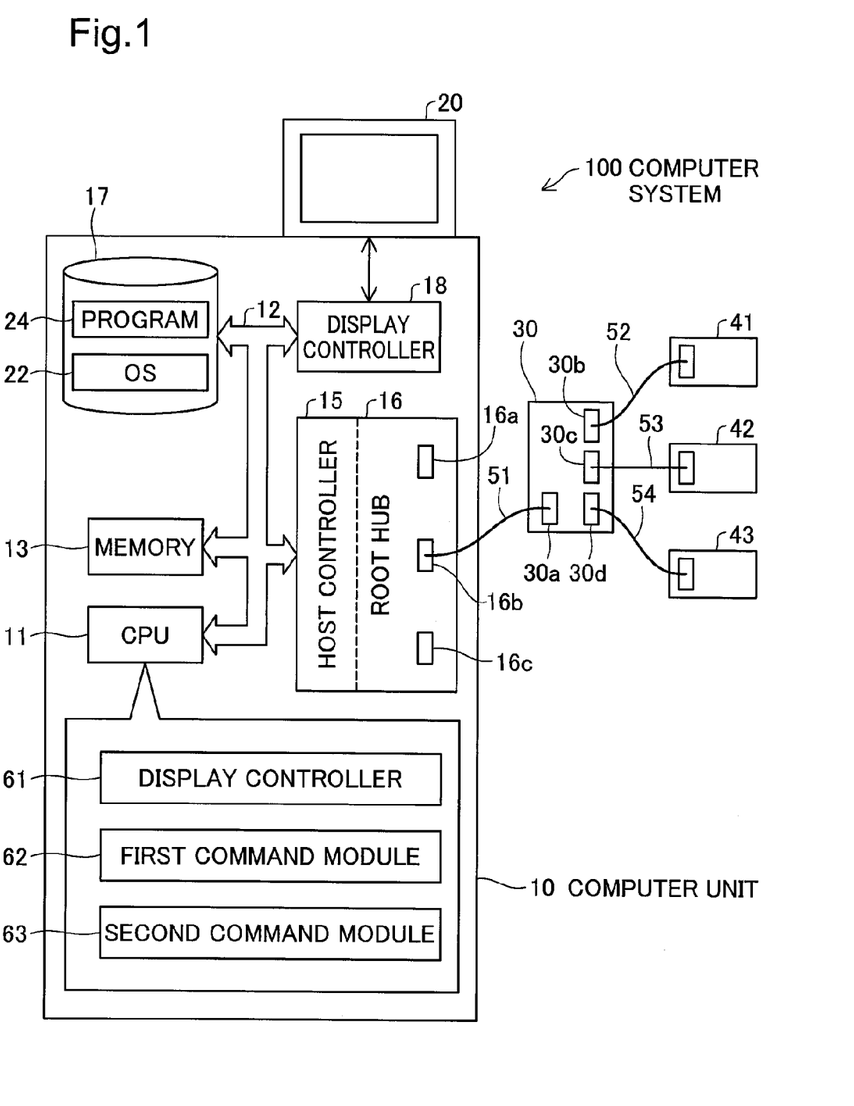
FIG. 1 is an illustration depicting the general features of a computer system 100 according to a first embodiment of the present invention.

FIG. 1 is an illustration depicting the general features of a computer system 100 according to a first embodiment of the present invention. As illustrated, the computer system 100 includes a personal computer 10, a display 20 connected to the personal computer 10, a single USB hub (hereinafter simply referred to as a hub) 30 connected to the personal computer 10, and three USB hard disks 41, 42, 43 connected to the hub 30. The personal computer 10 corresponds to the "computer unit" recited in the first aspect of the invention; the display 20 to the "display device" recited in the first aspect of the invention; and the USB hard disks 41 to 43 to the "storage media device" recited in the first aspect of the invention, respectively.

The personal computer 10 includes at its core a CPU 11 provided as the central processing unit, as well as a memory 13, a host controller 15, a root hub 16, a hard disk 17, and a display controller 18 interconnected by a bus 12. The personal computer 10 is also provided with a mouse and keyboard (not shown) as input devices.

The memory 13 stores data of various kinds and various programs, and serves as the working area for the CPU 11.

The host controller 15 serves as a USB interface unit. The root hub 16 is the connecting portion for the initial hub 30, and is integrated with the host controller 15. In the present embodiment, the root hub 15 has three ports 16a, 16b, 16c.

The hard disk 17 is one of internal type, and has stored thereon beforehand an operating system (OS) 22 and computer programs (hereinafter termed simply "programs") that run on the OS 22. The display controller 18 is a controller for controlling signal output to the display 20.

In the illustrated example, the hub 30 is connected to the second port 16b of the root hub 16 via a USB cable 51. The USB cable 51 is connected to the uplink port 30a of the hub 30. In the present embodiment, the hub 30 has three downlink ports 30b, 30c, 30d. To each of the three downlink ports 30b, 30c, 30d is respectively connected one of the first to third USB hard disks 41, 42, 43 via USB cables 52, 53, 54. The USB hard disks 41 to 43 are hard disk drives designed for USB connection.

As a result of the connections described above, there is configured a topology (corresponds to the "connections" referred to in the invention) in which the root hub is situated in a zero stage assigned stage a stage number (indicating level depth) of 0, the hub 30 is situated in a first stage assigned a stage number of 1, and the first to third USB hard disks 41, 42, 43 are situated in a second stage assigned a stage number of 2. This topology is merely exemplary, and may be designed appropriately according to the specifics of the system that is being implemented.

Through execution of the operating system 22 stored on the hard disk 17, The CPU 11 accomplishes the function of managing the devices included in the topology described above. As a result, using the Explorer application provided in the operating system 22, the CPU 11 is able to bring up on the display 20 a directory display of the files and folders that are stored on the personal computer 10 and the USB hard disks 41 to 43. The aforementioned Explorer application is a software application for browsing or searching data or information on the personal computer.

Additionally, through execution of the operating system 22 and the program 24, the CPU 11 carries out various elements of the computer unit of the present invention. The program 24 is provided in a form stored on CD-ROM (not shown) recording media, and is installed onto the hard disk 17 from the CD-ROM by running a prescribed installation program.

The program 24 could be provided in a form stored on some other mobile recording media (portable recording media) instead of CD-ROM, such as flexible disks, magnetooptical disks, or IC cards. The program 24 could be provided over a network from a specific server connected to an external network. This network could be the internet, and computer programs may be downloaded from a specific home page. Alternatively, computer programs could be delivered as e-mail attached files.

2. Software Configuration

In FIG. 1, the various elements are depicted as function blocks carried out internally by the CPU 11. Specifically, the CPU 11 includes the functions of a folder display controller 61, a first command module 62, and a second command module 63. As a result, the CPU 11 is able to switch the directory display function of the Explorer application of the operating system 22 to the unique mode employed the present embodiment. Following is a description of a directory list that shows the directory display, and of a control process according to the program 24, in that order.

Figure 2:
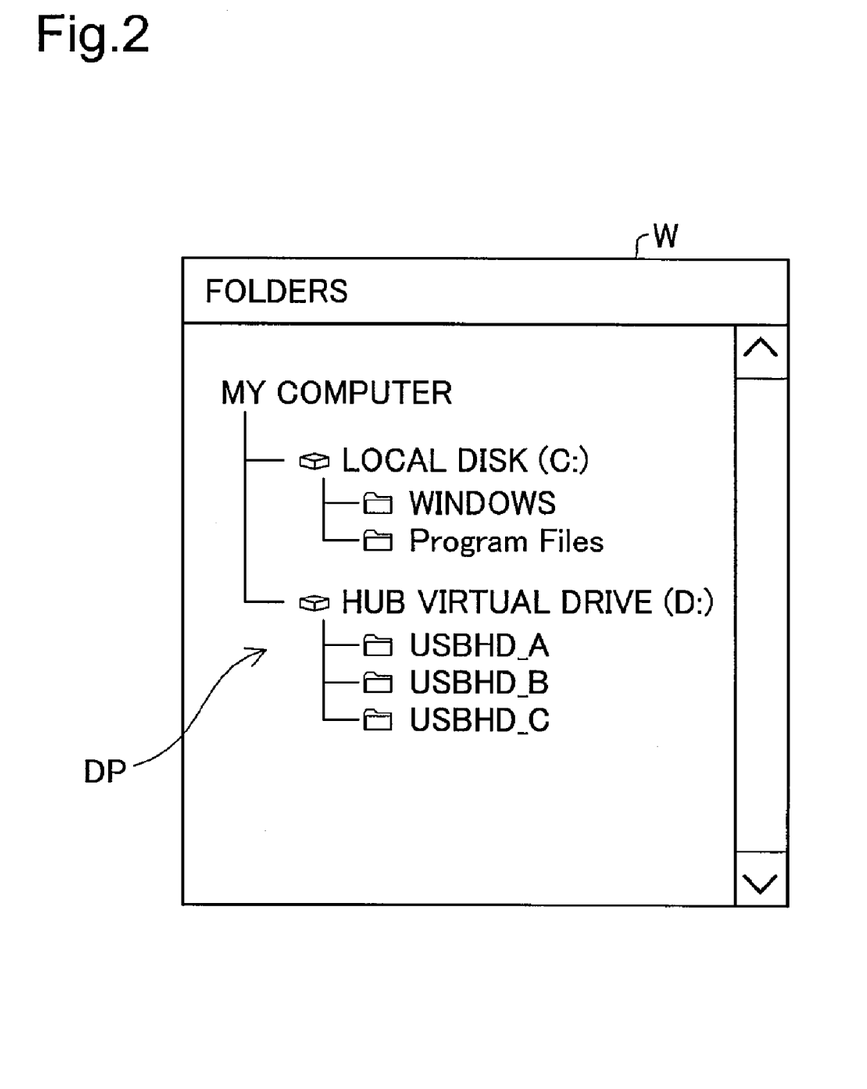
FIG. 2 is an illustration depicting a Folders display area W in Embodiment 1.

FIG. 2 is an illustration depicting a Folders display area W in Embodiment 1. This Folders display area W is included in a window displayed by the Explorer application, and shows a directory list DP of files and folders. In the example described here, the operating system 22 is the Windows™ OS.

As illustrated, the directory list DP shows a tree view with the label "My Computer" as the root, and the labels "Local Disk (C:)" and "Hub Virtual Driver (D:)" as branches. The "Local Disk (C:)" label represents the internal hard disk 17 of the personal computer 10, and indicates that the hard disk 17 was assigned the drive letter "C:". The "Hub Virtual Driver (D:)" label represents the hub 30 connected to the personal computer 10, and indicates that the hub 30 was assigned the drive letter "D:". That is, according to the directory list DP, the personal computer 10 is represented as having a hard disk 17 assigned the drive letter "C:" and a hub 30 functioning as a virtual drive assigned the drive letter "D:".

In the directory list DP, the "Local Disk (C:)" contains nested "WINDOWS" and "Program File" folders, while the "Hub Virtual Driver (D:)" contains nested "USBHD_A", "USBHD_B", and "USBHD_C" folders. This represents the fact that the personal computer 10 contains a "WINDOWS" folder and "Program File" folder; and that a "USBHD_A" folder corresponding to the first USB hard disk 41, a "USBHD_B" folder corresponding to the second USB hard disk 42, and a "USBHD_C" folder corresponding to the third USB hard disk 43, are connected to the hub 30.

The directory list DP is displayed on the display 20 when the CPU 11, having executed the control routine according to the program 24, starts up the Explorer application.

Figure 3:
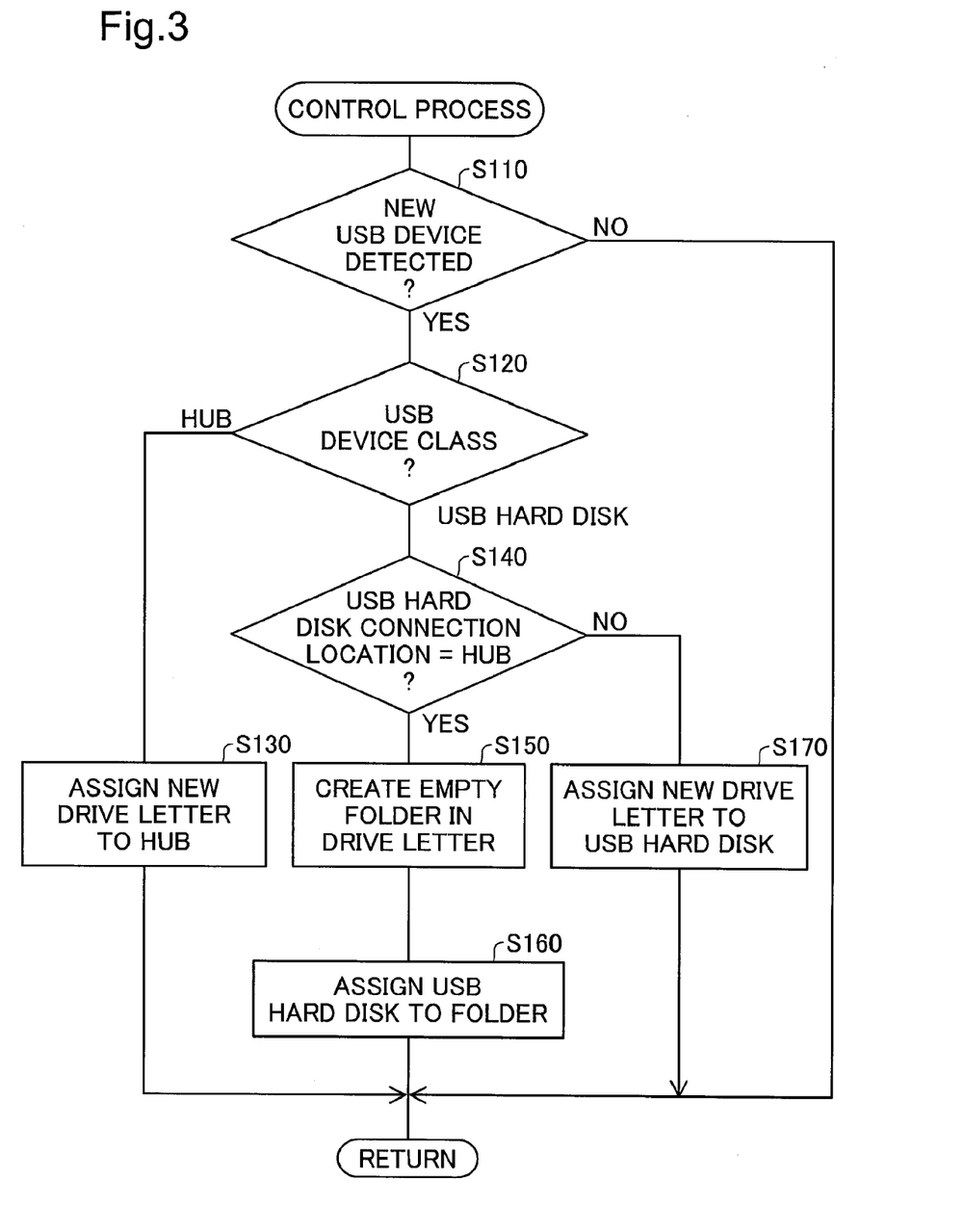
FIG. 3 is a flowchart showing a control process according to a program.

FIG. 3 is a flowchart showing a control process according to the program 24. This control process is executed repeatedly by the CPU 11 at prescribed intervals. When the process starts, the CPU 11 first determines if a new USB device was connected to any of the ports 16a to 16c of the root hub 16 (Step S110). More specifically, the CPU 11 polls the root hub 16 and determines whether any new USB device was connected to the root hub 16. Here, "USB devices" is used to include the hub 30, and of course the USB hard disks 41 to 43.

In Step S110, if it is determined that no USB device was detected (Step S110: NO), the process exits to "RETURN" and the control process terminates for the time being. If on the other hand it is determined in Step S110 that a USB device was detected (Step S110: YES), the CPU 11 determines whether the USB device is the hub 30 or one of the USB hard disks 41 to 43 (Step S120). If determined that the device is the hub 30 (Step S120: Hub), the CPU 11 assigns a new drive letter to the hub 30 (Step S130). Specifically, it assigns the next drive letter following the last assigned drive letter, for example, assigning the hub 30 the letter "D:" following the Local Disk (C:). As a result, the hub 30 is mounted into a drive (virtual drive) represented by the drive letter D:. After executing Step S130, the process exits to "RETURN" and the control process terminates for the time being.

If on the other hand it is determined in Step S120 that the USB device is a USB hard disk (Step S120: USB Hard Disk), it is determined whether the connection location for the USB hard disk is the hub 30 that was assigned a drive letter in Step S130 (Step S140). If determined that the connection location is the hub 30 (Step S140: YES), an empty folder is created in the drive letter that was assigned in Step S130. The CPU 11 then assigns to the folder that was created in Step S150 the USB hard disk whose connection was detected in Step S110, namely, the first USB hard disk 41 (Step S160). As a result, the first USB hard disk 41 is mounted into the virtual drive that was assigned to the hub 30 in Step S130. After executing Step S160, the process exits to "RETURN" and the control process terminates for the time being.

If by subsequently repeating this process at prescribed intervals it is detected that a new USB hard disk (e.g. 42) was connected to the hub 30, in Step S140 and Step S150, an additional empty folder is created in the new drive letter that was assigned in Step S130, and the second USB hard disk 42 is then assigned to that folder. If by subsequently repeating this process at prescribed intervals it is determined that yet another new USB hard disk (e.g. 43) was connected to the hub 30, in Step S140 and Step S150, an additional empty folder is created in the new drive letter that was assigned in Step S130, and the third USB hard disk 43 is then assigned to that folder.

Specifically, in the topology illustrated by way of example in FIG. 1, the first to third USB hard disks 41 to 43 are mounted in parallel into the drive (D:) of the hub 30 which has been configured as a virtual drive. As a result, the directory list DP displayed by the Explorer function of the operating system 22 appears in the form depicted in FIG. 2 above.

In Step S140 of FIG. 3, if it is determined the USB hard disk is not connected to the hub 30, i.e. that it is connected to a port 16a to 16c of the root hub 16 (Step S140: NO), a new drive letter is assigned to the USB hard disk (Step S170). As a result, the USB hard disk is mounted to that drive letter. Here, if the drive letter that was assigned in Step S130 is "D:", the drive letter "E:" is assigned for example. After executing Step S170, the process exits to "RETURN" and the control process terminates for the time being.

The process of Step S130 in the control process discussed above corresponds to the first command module 62 (FIG. 1), and the process of Steps S150 and S160 corresponds to the second command module 63 (FIG. 1). The folder display controller 61 (FIG. 1) corresponds to a feature whereby, upon receiving operator input from the mouse, the Explorer application of the operating system 22 starts up so that the Folders display area discussed above is displayed.

Figure 4:
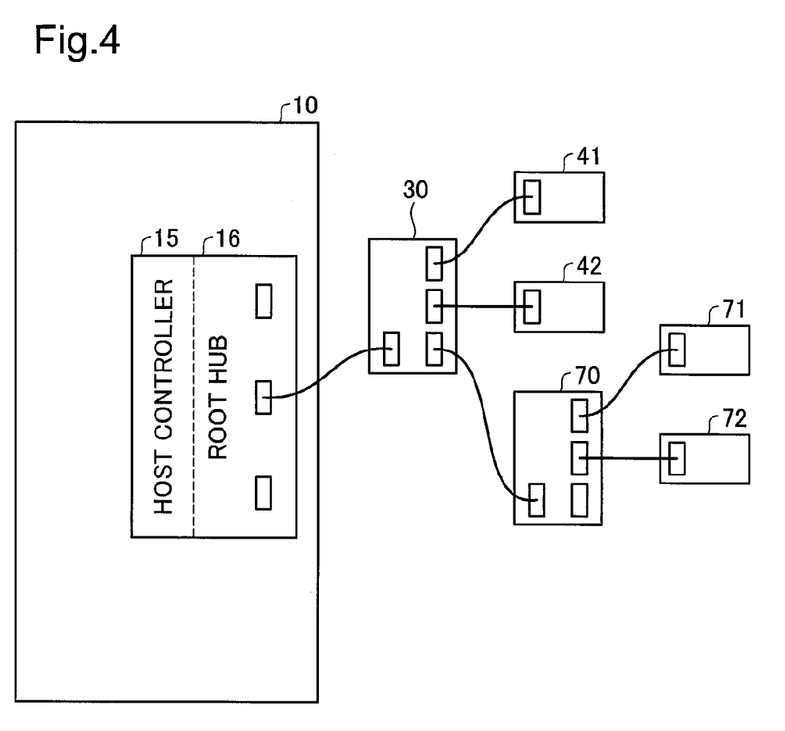
FIG. 4 is an illustration depicting another topology of a computer system.

FIG. 4 is an illustration depicting another topology in the computer system 100 of Embodiment 1. According to the topology shown by way of example in FIG. 4, the root hub 16 is situated in a zero stage assigned a stage number (indicating level depth) of 0; a first hub 30 is situated in a first stage assigned a stage number of 1; the first and second USB hard disks 41, 42 and a second hub 70 are situated in a second stage assigned a stage number of 2; and a third and fourth USB hard disks 71, 72 are situated in a third stage assigned stage number 3. Parts identical to those in FIG. 1 are assigned like symbols.

Figure 5:
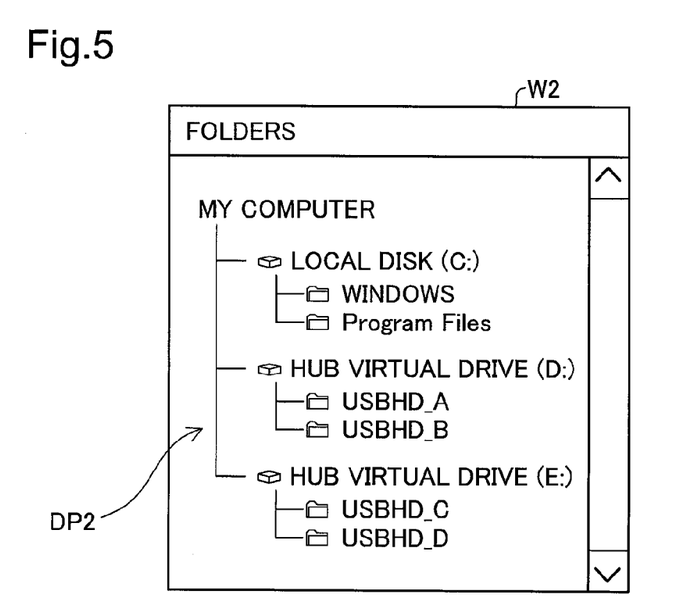
FIG. 5 is an illustration depicting a Folders display area W2 in this other topology.

In this topology environment, through execution of the aforementioned control process (FIG. 3) according the program 24, the directory list displayed by the Explorer application changes to one resembling that depicted in FIG. 5. As shown in FIG. 5, the directory list DP2 includes the hard disk assigned the drive letter "C:", the first hub 30 constituting a virtual drive assigned the drive letter "D:", and the second hub 70 constituting a virtual drive assigned the drive letter "E:".

A "USBHD_A" folder corresponding to the first USB hard disk 41 and a "USBHD_B" folder corresponding to the second USB hard disk 42 are shown connected to the first hub 30, while a USBHD_C" folder corresponding to the third USB hard disk 71 and a "USBHD_D" folder corresponding to the fourth USB hard disk 72 are shown connected to the second hub 70.

3. Effects of the Embodiment

According to the personal computer 10 provided to the computer system 100 of Embodiment 1 configured in the manner discussed above, the hub 30 connected to the root hub 16 is displayed as a single class, and the USB hard disks 41 to 43 connected to the hub 30 are displayed as included in that class, as described with reference to FIG. 2. Specifically, the USB hard disks 41 to 43 are shown categorized under the class of the hub 30 to which they are connected. The operator may thus easily view and select the USB hard disks 41 to 43 that are connected to the personal computer 10. Thus, Embodiment 1 affords improved ease of operation.

Embodiment 2

Figure 6:
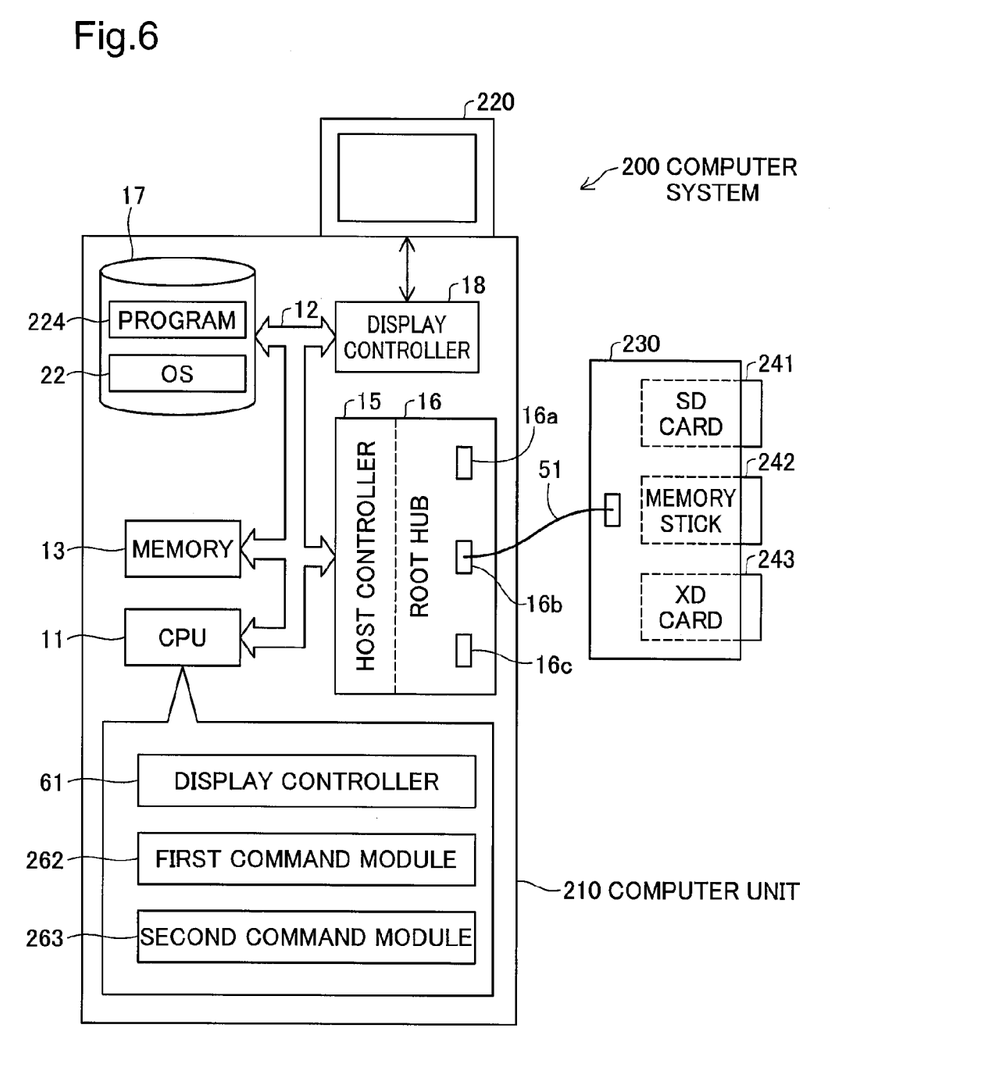
FIG. 6 is an illustration depicting the general features of an information processing system 200 according to a second embodiment of the present invention.

FIG. 6 is an illustration depicting the general features of a computer system 200 according to a second embodiment of the present invention. As illustrated, the computer system 200 includes a personal computer 210; a display 220 connected to the personal computer 210; a multi-card reader 230 connected to the personal computer 210; and an SD card 241, a Memory Stick 242, and an XD card 243 that are connected to the multi-card reader 230. The personal computer 210 corresponds to the "computer unit" recited in the second aspect of the invention; the display 220 to the "display device" recited in the second aspect of the invention; the multi-card reader 230 to the "reader device" recited in the second aspect of the invention; and media such as the SD card 241, the Memory Stick 242, and the XD card 243 to the "storage media" recited in the second aspect of the invention, respectively.

The hardware configuration of the personal computer 210 is comparable to that of the personal computer 10 of Embodiment 1. Like parts are assigned the same symbols as in Embodiment 1. The personal computer 210 differs from the personal computer 10 of Embodiment 1 only in terms of the program 224 that is stored on the hard disk 17. Because the program 224 differs from that of Embodiment 1, the function blocks carried out internally by the CPU 11 also differ from those in Embodiment 1. Specifically, the CPU 11 includes the functions of a folder display controller 61, a first command module 262, and a second command module 263. The folder display controller 61 performs the same functions as in Embodiment 1, and is therefore assigned the same drawing symbol as in Embodiment 1.

The multi-card reader 230 is able to read different types of media (storage media), and is furnished with three insertion slots. In the illustrated example, the multi-card reader 230 is connected to the second port 16b of the root hub 16 via a USB cable 51; the SD card 241, the Memory Stick 242, and the XD card 24 are loaded into the insertion slots of the multi-card reader 230.

As a result of the connections described above, there is configured a topology in which the root hub is situated in a zero stage assigned a stage number (indicating level depth) of 0, the multi-card reader 230 is situated in a first stage assigned a stage number of 1, and the SD card 241, the Memory Stick 242, and the XD card 243 are situated in a second stage assigned a stage number of 2. This topology is merely exemplary, and may be designed appropriately according to the specifics of the system that is being implemented.

Figure 7:
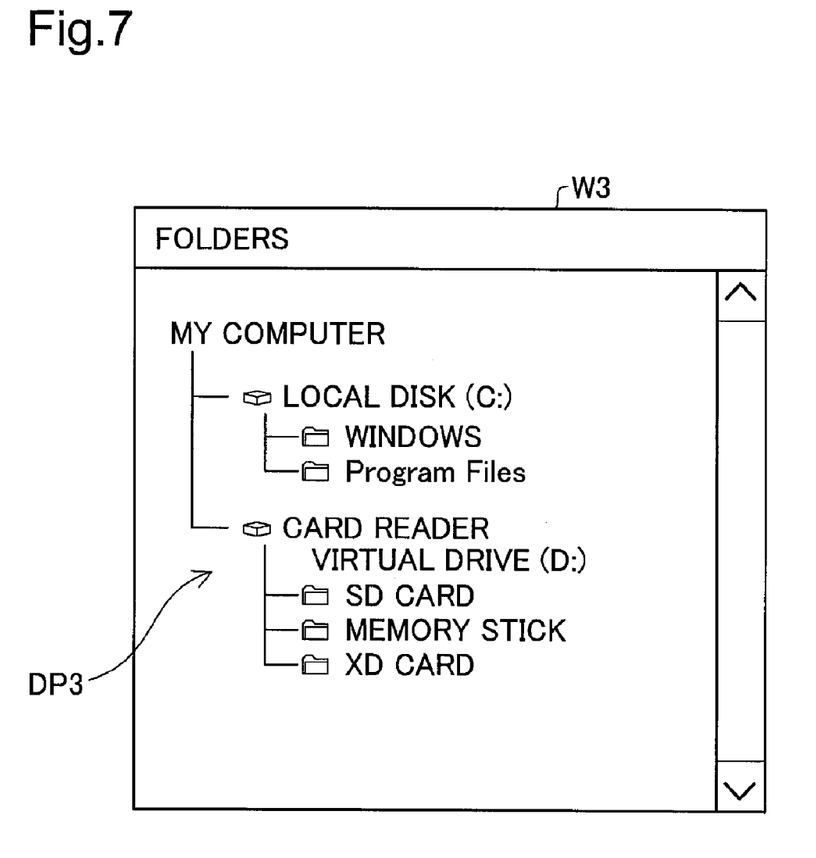
FIG. 7 is an illustration depicting a Folders display area W3 in Embodiment 2.

FIG. 7 is an illustration depicting a Folders display area W3 in Embodiment 2. As in Embodiment 1, this Folders display area W3 is included in a window displayed by the Explorer application, and shows a directory list DP3 of files and folders.

As illustrated, the directory list DP3 shows a tree view with the label "My Computer" as the root, and the labels "Local Disk (C:)" and "Card Reader Virtual Driver (D:)" as branches. The "Card Reader Virtual Driver (D:)" label represents the multi-card reader 230 connected to the personal computer 210, and indicates that the multi-card reader 230 was assigned the drive letter "D:". That is, according to the directory list DP3, the personal computer 210 is represented as having a hard disk 17 assigned the drive letter "C:" and a multi-card reader 230 functioning as a virtual drive assigned the drive letter "D:".

Also, in the directory list DP3, the "Card Reader Virtual Driver (D:)" contains nested "SD Card", a "Memory Stick", and "XD Card" folders. This represents the fact that an "SD Card" folder corresponding to the SD card 241, a "Memory Stick" folder corresponding to the Memory Stick 242, and an "XD Card" folder corresponding to the XD card 243, are connected to the multi-card reader 230.

Figure 8:
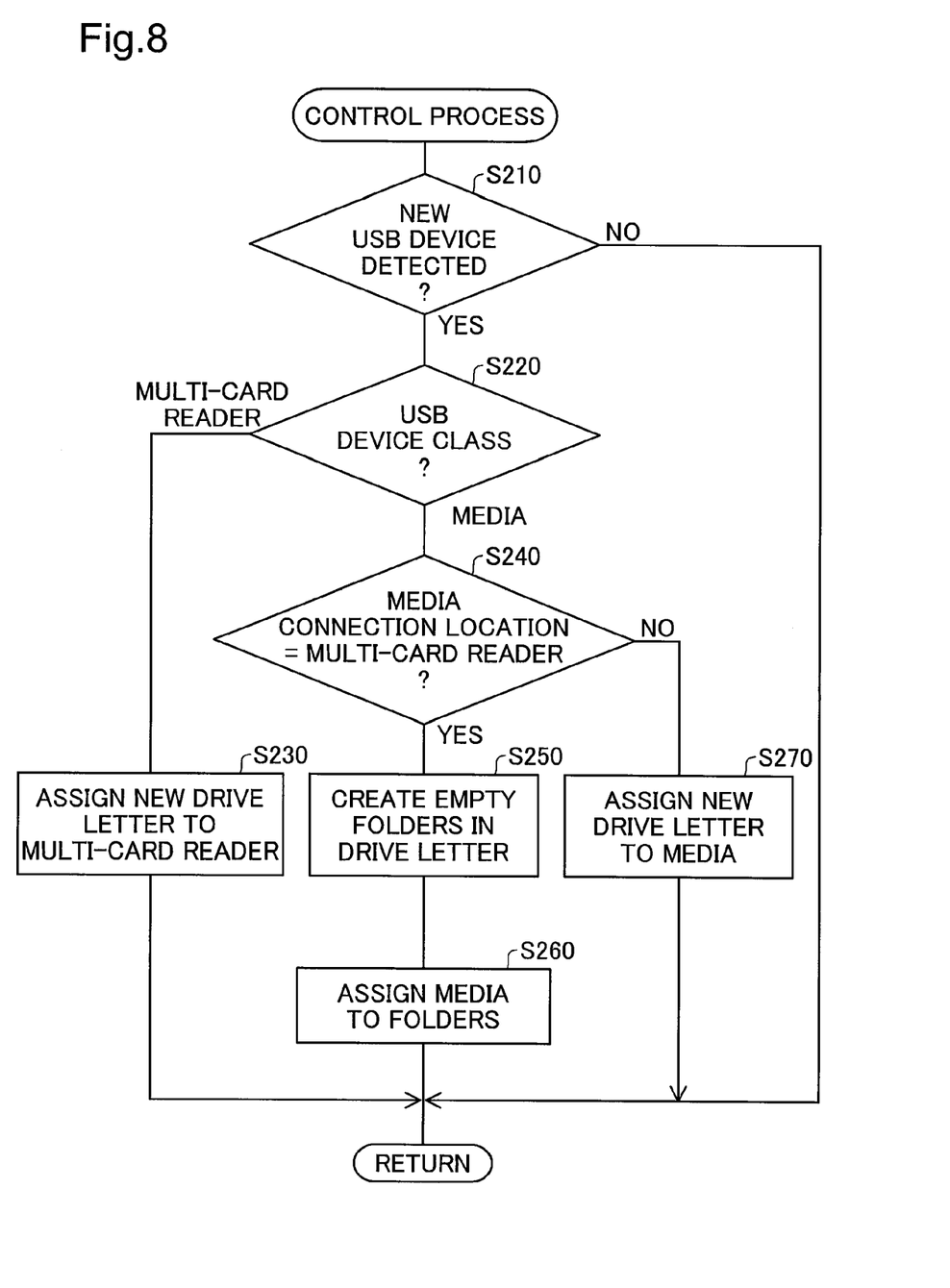
FIG. 8 is a flowchart showing a control process according to a program.

FIG. 8 is a flowchart showing a control process according to the program 224. This control process is executed repeatedly by the CPU 11 at prescribed intervals. This control process differs from the control process according to the program 24 in Embodiment 1 (FIG. 3; hereinafter termed the "Embodiment 1 control process") in that the "hub" in the Embodiment 1 control process is replaced by the "multi-card reader", and the "USB devices" in the Embodiment 1 control process are replaced by "media". Specifically, the control process in Embodiment 2 is as follows.

If in Step S210, the CPU 11 determines that a USB device was detected (Step S210: YES), and if in Step S220 then determines that the USB device is the multi-card reader 230 (Step S220: Multi-card Reader), it assigns a new drive letter to the multi-card reader 230 (Step S230).

If on the other hand in Step S220 it is determined that the USB device is media such as an SD card, Memory Stick, or XD card (Step S200: Media), it is then determined whether the installation location (connection location) of the media is the multi-card reader 230 that was assigned a drive letter in Step S230 (Step S240). If determined that the multi-card reader 230 is the installation location (Step S240: YES), the CPU 11 creates an empty folder in the drive letter that was assigned in Step S230 (Step S250), and assigns the USB whose connection was detected in Step S210, i.e. the SD card 241, to the folder created in Step S250 (Step S260).

Through subsequent repetition of the control process, a folder to which the Memory Stick 242 is assigned and a folder to which the XD card 243 is assigned are added to the drive letter that was assigned to the multi-card reader 230 in Step S230.

Specifically, in the topology illustrated by way of example in FIG. 6, the SD card 241, the Memory Stick 242, and the XD card 243 are mounted in parallel into the drive (D:) of the multi-card reader 230 which has been configured as a virtual drive. As a result, the directory list DP3 displayed by the Explorer function of the operating system 22 appears in the form depicted in FIG. 7 above.

The process of Step S230 in the control process discussed above corresponds to the first command module 262 (FIG. 6), and the process of Steps S250 and S260 corresponds to the second command module 263 (FIG. 6).

According to the personal computer 210 provided to the computer system 200 of Embodiment 2 configured in the manner discussed above, the multi-card reader 230 connected to the root hub 16 is displayed as a single class, and the SD card 241, the Memory Stick 242, and the XD card 243 loaded into the multi-card reader 230 are displayed as included in that class, as described with reference to FIG. 7. Specifically, the SD card 241, the Memory Stick 242, and the XD card 243 are shown categorized under the class of the multi-card reader 230 in which they are loaded. The operator may thus easily view and select the SD card 241, the Memory Stick 242, and the XD card 243 that are connected to the personal computer 210. Thus, Embodiment 2 affords improved ease of operation.

C. Embodiment 3

Figure 9:
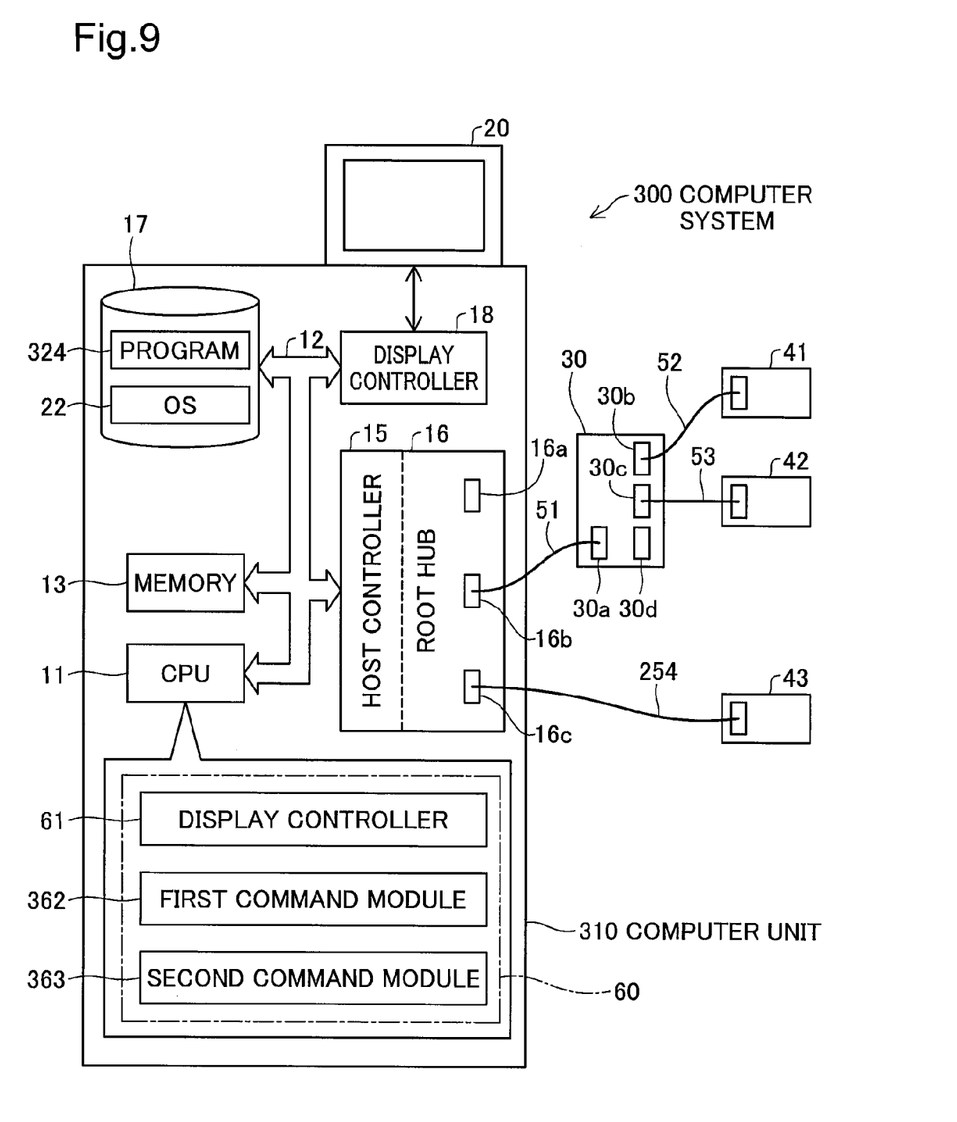
FIG. 9 is an illustration depicting the general features of an information processing system 300 according to a third embodiment of the present invention.

FIG. 9 is an illustration depicting the general features of a computer system 300 according to a third embodiment of the present invention. The computer system 300 of Embodiment 3 differs from the computer system 100 of Embodiment 1 in that the connection location for the third USB hard disk 43 is the root hub 16 rather than the hub 30. Specifically, the third USB hard disk 43 is connected to the third port 16c of the root hub 16 via a USB cable 254. In all other respects the hardware configuration is the same as in Embodiment 1. Like parts are assigned the same drawing symbols as in Embodiment 1.

The personal computer 310 differs from the personal computer 10 of Embodiment 1 only in terms of the program 324 that is stored on the hard disk 17. Because the program 324 differs from that of Embodiment 1, the function blocks carried out internally by the CPU 11 also differ from those in Embodiment 1. Specifically, the CPU 11 includes the functions of a folder display controller 61, a first command module 362, and a second command module 363. The folder display controller 61 performs the same functions as in Embodiment 1, and is therefore assigned the same drawing symbol as in Embodiment 1.

As a result of the connections described above, there is configured a topology in which the root hub is situated in a zero stage assigned a stage number (indicating level depth) of 0, the hub 30 and the third USB hard disk 43 are situated in a first stage assigned a stage number of 1, and the first and second USB hard disks 41, 42 are situated in a second stage assigned a stage number of 2. This topology is merely exemplary, and may be designed appropriately according to the specifics of the system that is being implemented.

Figure 10:
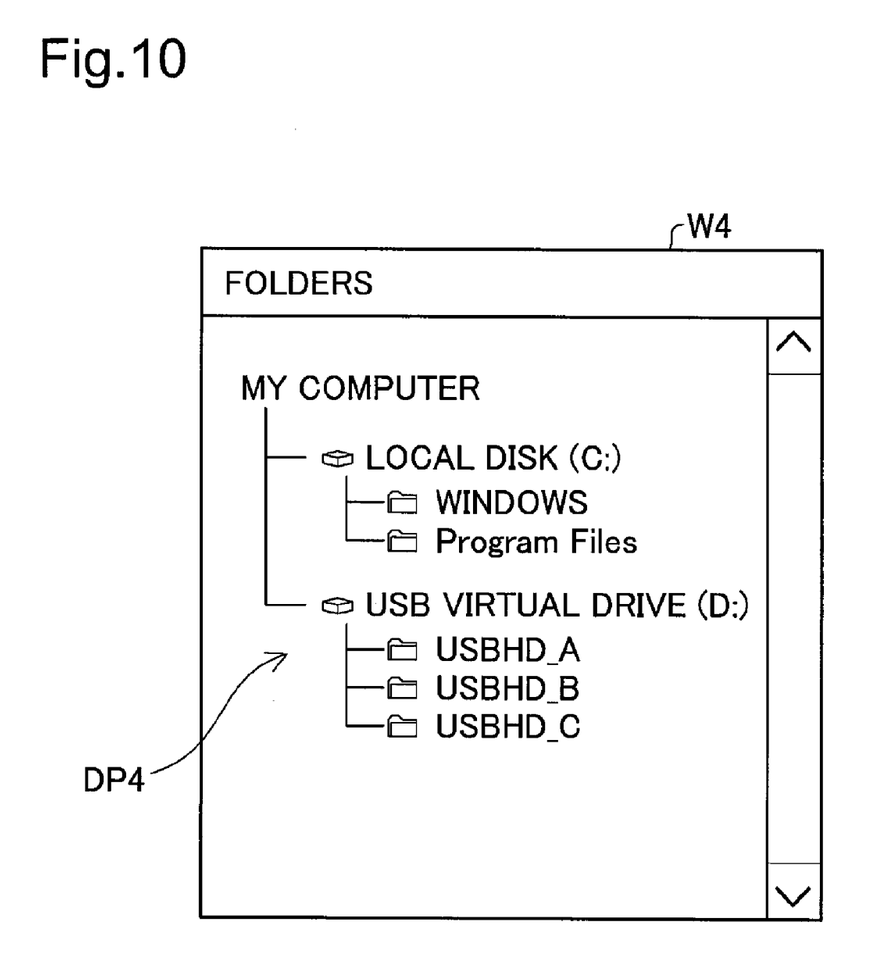
FIG. 10 is an illustration depicting a Folders display area W4 in Embodiment 3.

FIG. 10 is an illustration depicting a Folders display area W4 in Embodiment 3. As in Embodiment 1, this Folders display area W4 is included in a window displayed by the Explorer application, and shows a directory list DP4 of files and folders.

As illustrated, the directory list DP4 shows a tree view with the label "My Computer" as the root, and the labels "Local Disk (C:)" and "USB Virtual Driver (D:)" as branches. The "USB Virtual Driver (D:)" label represents the root hub 16, and indicates that the root hub 16 was assigned the drive letter "D:". That is, according to the directory list DP4, the personal computer 310 is represented as having a hard disk 17 assigned the drive letter "C:" and a root hub 16 functioning as a virtual drive assigned the drive letter "D:". The reason for designating the virtual drive as a "USB virtual driver" is that because the root hub 16 serves as a USB connection, it can be considered a USB virtual driver.

Also, in the directory list DP4, the "USB Virtual Driver (D:)" contains nested "USBHD_A", "USBHD_B", and "USBHD_C" folders. This represents the fact that a "USBHD_A" folder corresponding to the first USB hard disk 41, a "USBHD_B" folder corresponding to the second USB hard disk 42, and a "USBHD_C" folder corresponding to the third USB hard disk 43, are connected to the root hub 16. That is, the directory list DP4 shows connections of folders associated with all of the storage media devices with USB connections to the personal computer.

Figure 11:
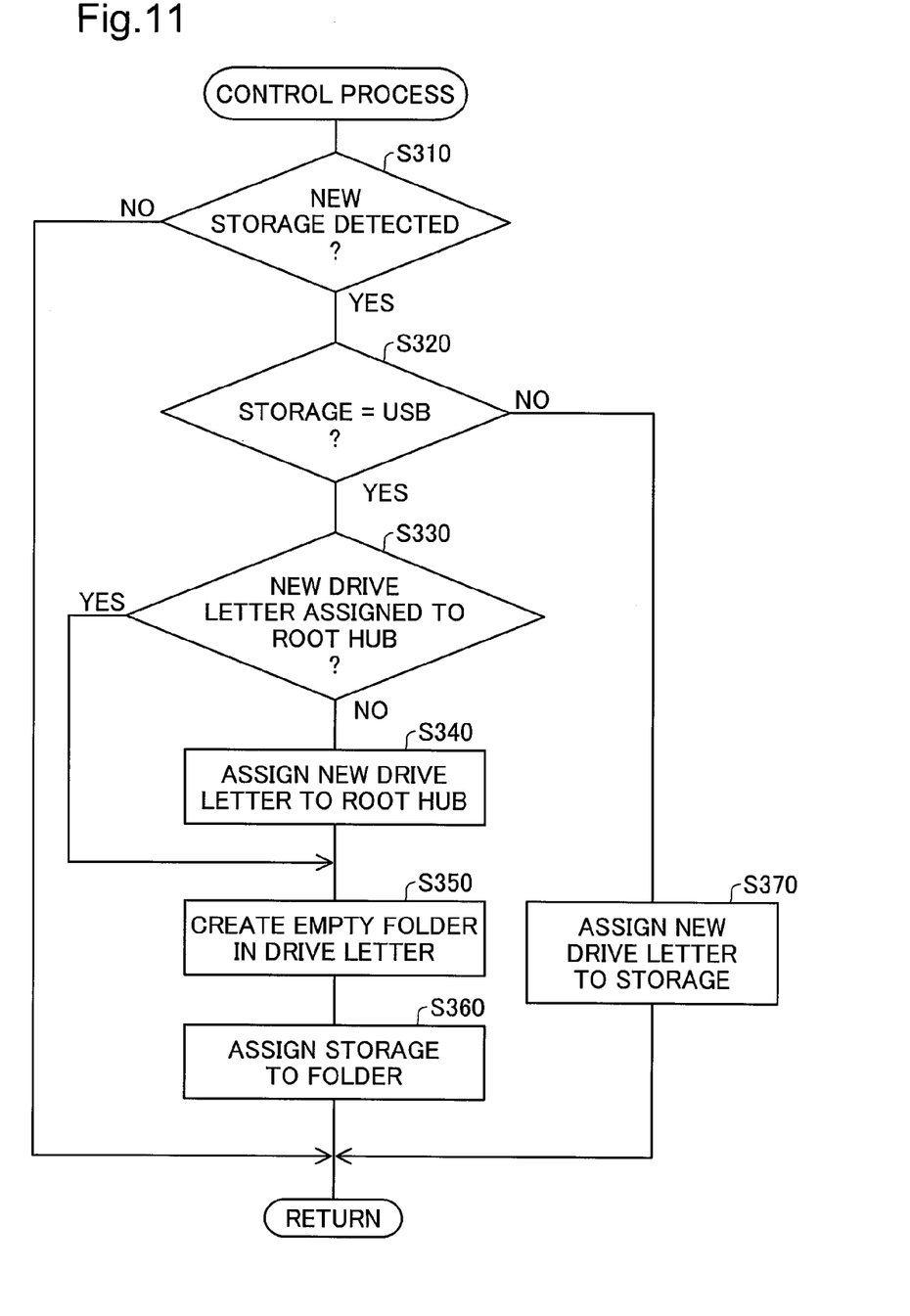
FIG. 11 is a flowchart showing a control process according to a program.

FIG. 11 is a flowchart showing a control process according to the program 324. This control process is executed repeatedly by the CPU 11 at prescribed intervals. When the process starts, the CPU 11 first determines if any new storage (storage media device) was connected to the personal computer 10 (Step S310). In this instance "connection" refers of course to direct connection to the personal computer 10, as well as to connection to the personal computer 10 indirectly via a hub device such as a hub.

In Step S310, if it is determined that no storage was detected (Step S310: NO), the process exits to "RETURN" and the control process terminates for the time being. If on the other hand in Step S310 it is determined that storage was detected (Step S310: YES), it is then determined whether the detected storage is a USB connection (Step S320).

If determined in Step S320 that the connection is a USB connection (Step S320: YES), the CPU 11 then determines whether a new drive letter was assigned to the root hub 16 (Step S330). If in Step S330 it is determined that a new drive letter was not assigned (Step S330: NO), the CPU 11 assigns a new drive letter to the root hub 16 (Step S340). This assigned drive letter serves as a USB virtual driver. After executing Step S340, or if in Step S330 it was determined that a new drive letter was already assigned to the root hub 16 (Step S330: YES), the CPU 11 advances to Step S350.

In Step S350, an empty folder is created in the drive letter that was assigned in Step S340. The CPU 11 then assigns the storage whose connection was detected in Step S310, e.g. the first USB hard disk 41, to the folder that was created in Step S350 (Step S360). As a result, the first USB hard disk 41 is mounted in the USB virtual drive that was assigned to the root hub 16 in Step S340. After executing Step S360, the process exits to "RETURN" and the control process terminates for the time being.

Through subsequent repetition of the control process, a folder to which the second USB hard disk 42 is assigned and a folder to which the third USB hard disk 43 is assigned are added to the drive letter that was assigned to the root hub 16 in Step S340.

Specifically, in the topology illustrated by way of example in FIG. 9, the first to third USB hard disks 41 to 43 are mounted in parallel in the drive (D:) of the root hub 16 which has been configured as a virtual drive. As a result, the directory list DP4 displayed by the Explorer function of the operating system 22 appears in the form depicted in FIG. 10 above.

The process of Step S340 in the control process discussed above corresponds to the first command module 362 (FIG. 9), and the process of Steps S350 and S360 corresponds to the second command module 363 (FIG. 9).

According to the personal computer 310 provided to the computer system 300 of Embodiment 3 configured in the manner discussed above, the root hub 16 is displayed as a single class, and the USB hard disks 41 to 43 connected to the root hub 16 either directly or indirectly via the hub 30 are displayed as included in that class, as described with reference to FIG. 10. Specifically, the USB hard disks 41 to 43 are shown categorized under the USB connection class. The operator may thus easily view and select the USB hard disks 41 to 43 that are connected to the personal computer 310. Thus, Embodiment 3 affords improved ease of operation.

D. Modifications

Modification 1:
In Embodiment 1, assignment of a drive letter takes place immediately after connection of a new hub is detected; however, in an alternative arrangement, after connection of a new hub is detected, assignment of a drive letter may take place when a USB hard disk is initially connected to the hub, with creation of an empty folder and assignment of the USB hard disk thereto taking place thereafter.

Modification 2:
In Embodiment 2, assignment of a drive letter takes place immediately after connection of a new multi-card reader is detected; however, in an alternative arrangement, after connection of a new multi-card reader is detected, assignment of a drive letter may take place when media are initially loaded into the multi-card reader, with creation of empty folders and assignment of the media thereto taking place thereafter.

Modification 3:
In Embodiment 3, assignment of a drive letter to the root hub takes place when connection of new USB storage is detected; however, in an alternative arrangement, a drive letter may be assigned to the root hub at startup of the computer unit; and when initial connection of a USB hard disk to the root hub is detected, a drive letter may be assigned thereto, with creation of an empty folder and assignment of the USB hard disk thereto taking place thereafter.

Modification 4:

Embodiment 1 and Embodiment 3 describe examples of USB hard disks as storage media devices connected to the hub or root hub, but other drives with USB connections can be used in place of USB hard disks, such as USB flash drives (USB memory) for example. The three USB hard disks 41 to 43 could be replaced in part by other drives. A combination of a card reader unit and a memory card could be substituted as well, provided that it constitutes a storage media device.

Modification 5:

In the preceding Embodiment 2, an SD card, a Memory Stick, and an XD card were shown as examples of storage media (media), but these could be replaced by any media capable of storing data. For example, they could be replaced by media such as SmartMedia or Microdrive. The reader device could be one designed to read a single type of media, rather than a multi-card reader. That is, any reader device able to be loaded with several media of the same type or different types can be substituted.

Modification 6:

In the preceding Embodiments 1 to 3, the root hub has a USB connection, but some other interface such as SCSI or IEEE 1394 could be used instead.

Modification 7:

While the preceding Embodiments 1 to 3 described examples of Windows as the operating system, some other OS such as UNIX™, Linux, or the Mac OS™ could be employed instead.

Some of the features implemented through hardware in the preceding Embodiments and Modifications may be replaced by software, and conversely some the features implemented through software could be replaced by hardware.

While the invention has been described with reference to preferred exemplary embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more less or only a single element, are also within the spirit and scope of the invention.

What is claimed is:

1. A computer unit furnished with a root hub of a prescribed interface, and running an operating system that has a function of managing a storage media device connected to the root hub directly or indirectly via a hub, comprising:
a topology configuration portion that, when the hub is connected to a port of the root hub and the storage media device is connected to the hub, configures the hub as a virtual drive and sets up a connection whereby a folder corresponding to the storage media device is placed in the virtual drive; and
a display controller that displays on a display device a directory list of connections that were configured by the topology configuration portion.

2. The computer unit in accordance with claim 1, wherein the display controller includes:
a folder display controller that through operation of the operating system brings up a directory display of drive letters and of folders contained in drives to which the drive letters correspond, and
the topology configuration portion includes:
a first command module that, when connection of the hub is detected, prompts the operating system to assign a drive letter to the hub; and
a second command module that, when connection of the storage media device is detected, prompts the operating system to mount the storage media device into a drive represented by the assigned drive letter.

3. The computer unit according to any one of claim 1, wherein the prescribed interface is an interface compliant with USB standards.

4. A computer unit furnished with a root hub of a prescribed interface, and running an operating system that has a function of managing storage media that are connected to the root hub, comprising:
a topology configuration portion that, when a reader device adapted to read a plurality of storage media is connected to a port of the root hub and additionally the storage media are loaded into the reader device, configures the reader device as a virtual drive and sets up a connection whereby a folder corresponding to the storage media is placed in the virtual drive; and
a display controller that displays on a display device a directory list of connections that were configured by the topology configuration portion.

5. The computer unit in accordance with claim 4, wherein the display controller includes:
a folder display controller that through operation of the operating system brings up a directory display of drive letters and of folders contained in drives to which the drive letters correspond, and
the topology configuration portion includes:
a first command module that, when connection of the reader device is detected, prompts the operating system to assign a drive letter to the reader device; and
a second command module that, when loading of the storage media is detected, prompts the operating system to mount the storage media into a drive represented by the assigned drive letter.

6. A computer unit furnished with a root hub of a prescribed interface, and running an operating system that has a function of managing a storage media device connected to the root hub, comprising:
a topology configuration portion that, when the storage media device is connected directly or indirectly to the root hub, configures the root hub as a virtual drive and sets up a connection whereby a folder corresponding to the storage media device is placed in the virtual drive; and
a display controller that displays on a display device a directory list of connections that were configured by the topology configuration portion.

7. The computer unit in accordance with claim 6, wherein the display controller includes:
a folder display controller that through operation of the operating system brings up a directory display of drive letters and of folders contained in drives to which the drive letters correspond,
the topology configuration portion includes:
a first command module that prompts the operating system to assign a drive letter to the root hub; and
a second command module that, when connection of the storage media device to the root hub is detected, prompts the operating system to mount the storage media device into a drive represented by the assigned drive letter.

8. A computer processing method for managing a storage media device connected to a root hub of a prescribed interface directly or indirectly via a hub, the method comprising the steps of:

when the hub is connected to a port of the root hub and the storage media device is connected to the hub, configuring the hub as a virtual drive and setting up a connection whereby a folder corresponding to the storage media device is placed in the virtual drive; and displaying on a display device a directory of the connection.

9. A computer processing method for managing storage media that are connected to a root hub of a prescribed interface, the method comprising the steps of:

when a reader device adapted to read a plurality of storage media is connected to a port of the root hub and additionally the storage media are loaded into the reader device, configuring the reader device as a virtual drive and setting up a connection whereby a folder corresponding to the storage media is placed in the virtual drive; and displaying on a display device a directory of the connection.

10. A computer processing method for managing a storage media device connected to a root hub of a prescribed interface, the method comprising the steps of:

when the storage media device is connected directly or indirectly to the root hub, configuring the root hub as a virtual drive and setting up a connection whereby a folder corresponding to the storage media device is placed in the virtual drive; and displaying on a display device a directory of the connection.

11. A computer program product for a computer unit furnished with a root hub of a prescribed interface, and running an operating system that has a function of managing a storage media device connected to the root hub directly or indirectly via a hub, the computer program product comprising:

a non-transitory computer readable medium; and a computer program stored on the non-transitory computer readable medium, the computer program comprising:

a portion for prompting the operating system to assign a drive letter to the hub when connection of the hub to a port of the root hub is detected; and a portion for prompting the operating system to mount the storage media device into a drive represented by the assigned drive letter when connection of the storage media device to the hub is detected.

12. A computer program product for a computer unit furnished with a root hub of a prescribed interface, and running an operating system that has a function of managing storage media connected to the root hub, the computer program product comprising:

a non-transitory computer readable medium; and a computer program stored on the non-transitory computer readable medium, the computer program comprising:

a portion for prompting the operating system to assign a drive letter to the reader device when connection of a reader device adapted to read a plurality of storage media to a port of the root hub is detected; and a portion for prompting the operating system to mount the storage media into a drive represented by the assigned drive letter when loading of the storage media into the storage media device is detected.

13. A computer program product for a computer unit furnished with a root hub of a prescribed interface, and running an operating system that has a function of managing a storage media device connected to the root hub, the computer program product comprising:

a non-transitory computer readable medium; and a computer program stored on the non-transitory computer readable medium, the computer program comprising:

a portion for prompting the operating system to assign a drive letter to the root hub; and a portion for prompting the operating system to mount the storage media device into a drive represented by the assigned drive letter when connection of the storage media device directly or indirectly to the root hub is detected.

* * * * *